US005745558A

United States Patent [19]
Richardson, Jr. et al.

[11] Patent Number: 5,745,558
[45] Date of Patent: Apr. 28, 1998

[54] THREE-WAY CALL DETECTION AND RESPONSE SYSTEM

[75] Inventors: Charles T. Richardson, Jr., Norcross; Samuel F. Billingsley, III, Atlanta; Robert W. Livingston, Jr., Suwanee, all of Ga.

[73] Assignee: United States Advanced Network, Inc., Norcross, Ga.

[21] Appl. No.: 549,258

[22] Filed: Oct. 27, 1995

[51] Int. Cl.$^6$ .................................................. H04M 3/20
[52] U.S. Cl. .......................... 379/189; 379/199; 379/386; 379/212; 379/35
[58] Field of Search ................................ 379/34, 35, 67, 379/74, 81, 85, 188, 189, 196, 197, 198, 212, 243, 245, 194

[56] References Cited

U.S. PATENT DOCUMENTS

| | | | |
|---|---|---|---|
| 4,055,730 | 10/1977 | Stapleford et al. | 379/372 |
| 5,319,702 | 6/1994 | Kitchin et al. | 379/189 |
| 5,535,261 | 7/1996 | Brown et al. | 379/194 |
| 5,539,812 | 7/1996 | Kitchin et al. | 379/189 |

OTHER PUBLICATIONS

AT&T, "AT&T Announces A Virtually Fraud–Proof Calling System", Oct. 1993, Correctional Communications Quarterly.

Susan Anderson, Three–Way Call Detect: Close Enough To Perfect?, Oct. 1993, p. 15–19, Correctional Comm. Quarterly.

*Primary Examiner*—Harry S. Hong
*Assistant Examiner*—Daniel S. Hunter
*Attorney, Agent, or Firm*—Isaf, Vaughan & Kerr; Louis T. Isaf

[57] ABSTRACT

A three-way call detection and response system comprising, in accordance with a preferred embodiment, a three-way call detector coupled non-intrusively, by a bridge repeater, to a communication path carrying digital signals between originator and recipient end office telecommunication switches. The three-way call detector includes an interface and a digital signal processor electrically connected to the bridge repeater for receipt of digital signals from the communication path. The three-way call detector also includes a local controller which interacts with the interface, a digital signal processor, and a remote controller. The remote controller executes a plurality of software programs which control operation of the system. In accordance with a preferred method, the three-way call detection and response system monitors the communication path for indicia representative of a three-way call signature and, hence, an attempted three-way call placement. Upon identifying a suspected three-way call signature, the system examines the digital signals to determine the spectral characteristics of a suspected release pulse of the suspected three-way call signature. Using pattern recognition techniques to compare the spectral characteristics of the suspected release pulse with the spectral characteristics of known, reference release pulses, the system determines whether or not the release pulse is substantially similar to the release pulse of an actual three-way call signature. If so, and after also identifying first and second periods of silence about the release pulse, the system responds to the detection, for example, by disconnecting the telephone call, playing a recording over the communication path, or creating a record of the attempted three-way call placement.

33 Claims, 9 Drawing Sheets

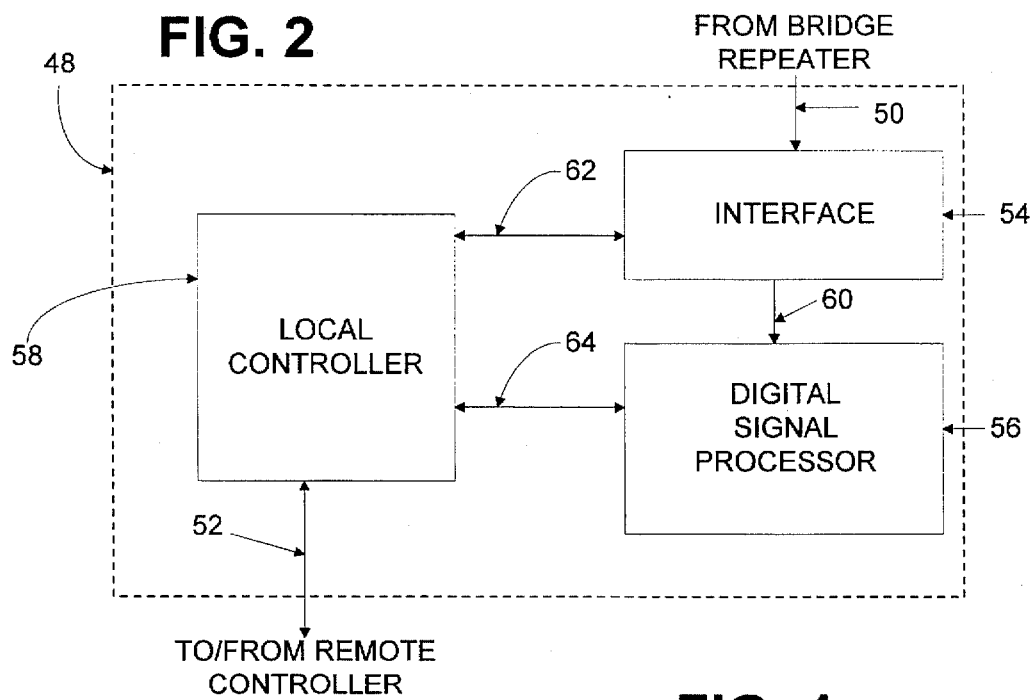
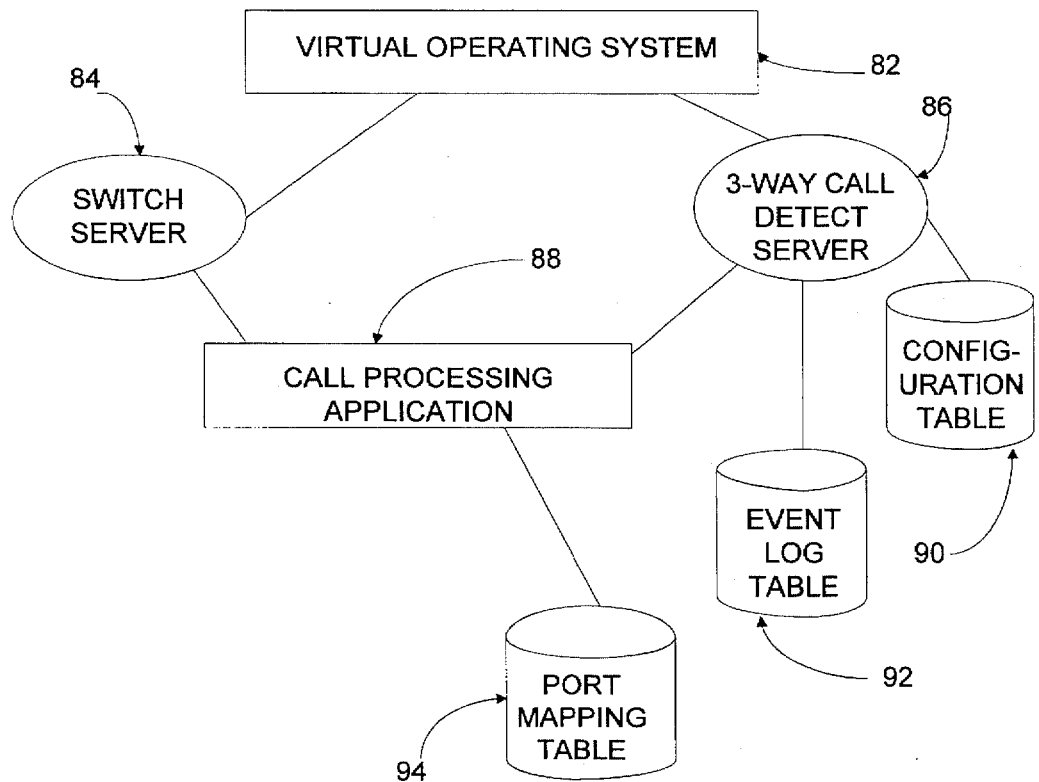

THREE-WAY CALL DETECTION AND RESPONSE SYSTEM

BACKGROUND OF THE INVENTION

The present invention relates generally to the field of telephone call control and, in its most preferred embodiments, to the field of apparatus and methods for detecting and responding to an attempted three-way telephone call placement.

Today's modern telephone systems provide individuals and businesses with a variety of customizable telephone features and services. One of these features, known as conference or "three-way" calling, enables a telephone customer having three-way calling service (also referred to herein as the telephone call recipient or simply, the recipient) to establish a telephone connection between a telephone call originator (also referred to herein as the originator), himself (i.e., the telephone call recipient), and a third party. To establish the connection or "three-way call", the recipient receives a telephone call from the originator and subsequently places the telephone call on hold by depressing and releasing the switch hook on his telephone. Upon receiving a dial tone, the recipient dials the telephone number of the third party and establishes a connection with the third party. Then, the recipient depresses and releases his switch hook a second time to connect all three individuals.

The telephone call recipient generally receives basic telephone service and additional services, including three-way calling service, from a local telephone company having a telephone switch (also referred to herein as the recipient's end office switch) located at an end office near the location of the recipient's telephone. The recipient's end office switch connects to the recipient's telephone via, at least, a codec device (which converts signals between analog and pulse code modulated (PCM) digital forms) and a distribution network which carries analog signals between the codec device and the recipient's telephone. Similarly, the telephone call originator generally receives telephone service from a local telephone company having a telephone switch (also referred to herein as the originator's end office switch) located at an end office near the location of the originator's telephone. The recipient's telephone is similarly connected to the recipient's switch by a codec device and an analog distribution network. When the originator places a telephone call to the recipient, the originator's end office switch routes the call to the recipient's end office switch and, hence, to the recipient via, generally, digital T1 facilities which include a number of other telephone switches (including, but not limited to interchange carrier switches, access tandem switches, and other end office switches). Together, the switches, T1 facilities, codecs, and analog distribution network are referred to by those skilled in the art as the public switched network or PSN. The routing process and T1 facilities define two, one-way, digital communication paths between the originator's end office switch and the recipient's end office switch. The first communication path carries signals transmitted by the originator and received by the recipient, while the second communication path carries signals transmitted by the recipient and received by the originator.

When the telephone call recipient attempts to place a three-way call by depressing his switch hook as described above, the recipient's end office switch receives a first pulse which it transmits via the public switched telephone network along a one-way, digital communication path to the originator's telephone. After receiving the first pulse (known, in the telecommunications industry, as a switch hook request), the recipient's end office switch transmits a first period of "silence" lasting approximately 250 milliseconds to 1.2 seconds followed by a second pulse created when the recipient releases his switch hook. In combination, the first pulse, first period of silence, and second pulse are known in the telecommunicatons industry as a "hook-flash event". Similar to the first pulse, the first period of silence and second pulse are received at the originator's telephone via the one-way, digital communication path of the public switched network. In response to the depression and release of the recipient's switch hook, the recipient's end office switch suspends the telephone call and outputs a dial tone to the recipient. While the recipient dials the third party's telephone number, a second period of "silence", lasting at least 4 seconds, is observable at the originator's telephone.

While the detection of an attempted three-way call placement is of, perhaps, minor importance in many environments, the detection and response to an attempted placement of a three-way call is extremely important in the penal environment. Since prisoners often have abundant amounts of free time on their hands, inmate telephone privileges frequently provide inmates with opportunities for making nuisance calls to judges, victims, and other parties. Fortunately, some of today's telephone systems can prevent inmates from placing direct calls to parties who are previously identified to the systems by their telephone numbers. Unfortunately, many of the same telephone systems cannot prevent inmates from placing a call to a cohort "on the outside" having three-way calling service who, in turn, connects the inmate with the third party with whom the inmate wishes to talk.

U.S. Pat. No. 5,319,702, Kitchin et al., represents one system which has attempted to provide an apparatus and method for detecting the attempted placement of a three-way call by detecting a hook-flash event. Unfortunately, the apparatus is a premises-based solution and must be physically integrated with each telephone in order to function properly. As a result, the apparatus is not readily adaptable for use in a telecommunications network which would enable a single apparatus to service a plurality of telephones and a plurality of premises. In addition, the method attempts to detect a hook-flash event, in part, by identifying a pulse, present in a particular frequency band, and specific event(s) occuring after the pulse. Because the pulse may be masked by (or duplicated by) noise created along a communication path or by noise created by an individual seeking to avoid detection and because the pulse may occur within a different frequency band, the method would appear to suffer from poor reliability and would appear to have a high rate of failing to detect (or erroneously detecting) an attempted three-way call placement.

There is, therefore, a need in the industry for an apparatus and method which can more reliably detect and respond to the attempted placement of a three-way call and can solve other related and unrelated problems that become apparent upon reading and understanding this specification.

SUMMARY OF THE INVENTION

Briefly described, the present invention includes a three-way call detection and response system which enables, at a location distant from the location of the originator's telephone, the detection of and response to an attempted three-way call placement by a telephone call recipient. More particularly, the present invention includes a signal acquisition apparatus which employs a non-intrusive tap to monitor a simplex, digital communication channel (also referred to herein as a one-way, digital communication path) carrying signals from the recipient's end office switch toward the originator's end office switch, and a pattern recognition apparatus and method to detect indicia, on the communication channel, which are representative of the attempted initiation or placement of a three-way telephone call (also referred to herein as a three-way call signature or, simply, as a signature) by the recipient. The three-way call signature, detected in the present invention, includes a first period of silence which precedes a pulse, corresponding to the release of a switch hook (also referred to herein as a release pulse), which is, in turn, followed by a second period of silence. By distinguishing and identifying all three portions of the three-way call signature, in the above-described sequence and without frequency filtering, from other signals travelling on the digital communication channel, the present invention identifies the attempted placement of a three-way telephone call.

In the preferred embodiment of the apparatus of the present invention, a bridge repeater (i.e., a non-intrusive tap) is electrically interposed between a one-way digital communication path, having multiple channels and extending between telephone switches, and an interface at a location between the telephone switches. The interface receives an amplified and retimed DS-1 signal from the bridge repeater, demultiplexes the DS-1 signal, and ports a pulse code modulated (PCM) signal, corresponding to a selected channel of the DS-1 signal, to a connected digital signal processor. A local controller is electrically connected between the interface, the digital signal processor, and a remote controller by a plurality of control links. The local controller interprets commands received from the remote controller and exchanges various control signals via the control links to the interface and the digital signal processor. The local controller also transmits various control signals to the remote controller via a control link, for instance, to signal detection of a three-way call signature and, hence, an attempted three-way call placement. The remote controller is additionally electrically connected by a control link to a telephone switch to enable the remote controller to exercise control over the connection, disconnection, routing, and identification of communication paths. A plurality of software programs, executed by the remote controller, access a plurality of data tables and, in conjunction, allow the remote controller to determine necessary actions and responses by the system.

In accordance with a preferred embodiment of the method of the present invention, the three-way call detection and response system receives notification of the placement of a telephone call from an originator at an originator telephone, initiates monitoring of the call, and issues commands causing the completion of the call to a recipient at a recipient telephone. The system monitors and examines digital signals carried on a communication path from the recipient's end office switch to the originator's end office switch by non-intrusively tapping the communication path to acquire duplicate signals, thereby enabling monitoring without degradation of the signals traveling on the communication path. The system continually monitors the digital signals to detect an attempted three-way call placement which it initially identifies as a "suspected three-way call signature". By subsequently analyzing the signals corresponding to the suspected three-way call signature, the system determines whether or not the suspected three-way call signature is an actual three-way call signature and, hence, whether or not an attempted three-way call placement has been performed by the recipient. Upon determining that an actual three-way call signature has been detected, the system responds, for example, by commanding disconnection of the telephone call, playing back a recording to the originator and recipient telephones, and creating a record of the event in a data table for later use by administrators.

The three-way call detection and response system, in accordance with the preferred method, identifies a suspected three-way call signature upon detection of a suspected first period of silence. After receiving additional digital signals following the suspected first period of silence, the system then examines the signals to detect the presence of a suspected release pulse and a suspected second period of silence, in series, succeeding the suspected first period of silence. The suspected first and second periods of silence are identified as being actual first and second periods of silence belonging to an actual three-way call signature by determining that the suspected periods of silence have sufficient time duration and minimal signal amplitudes. The suspected release pulse is identified as being an actual release pulse belonging to an actual three-way call signature by comparing the spectral characteristics (including, but not limited to the combination of time duration, frequency, and energy level) of the suspected release pulse to the spectral characteristics of a plurality of known, reference release pulses using digital pattern recognition techniques. In accordance with the preferred method, the spectral characteristics of the known, reference release pulses have been previously determined and stored by the system. Use of the pattern recognition process with a plurality of reference release pulses, acquired from a plurality of previously made three-way telephone calls from a plurality of recipient telephones at different locations around the country, enables the system to more accurately determine whether or not a suspected release pulse of a suspected three-way call signature is an actual release pulse of an actual three-way call signature and, hence, whether or not a three-way call placement has been attempted by a telephone call recipient.

Accordingly, an object of the present invention is to detect an attempted three-way call placement using an apparatus located distant from an originator telephone.

Another object of the present invention is to detect an attempted three-way call placement by monitoring a digital communication path between an originator end office switch and a recipient end office switch.

Still another object of the present invention is to detect an attempted three-way call placement by monitoring digital signals carried by a communication path from a recipient end office switch to an originator end office switch.

Still another object of the present invention is to detect an attempted three-way call placement by monitoring signals carried by a communication path between an originator end office switch and recipient end office switch without degrading the signals.

Still another object of the present invention is to detect an attempted three-way call placement using an apparatus positioned electrically between telephone switches.

Still another object of the present invention is to detect an attempted three-way call placement by detecting a three-way call signature transmitted by a recipient end office switch.

Still another object of the present invention is to detect an attempted three-way call placement by identifying a first period of silence, a release pulse, and a second period of silence in series.

Still another object of the present invention is to identify a suspected release pulse as an actual release pulse of an actual three-way call signature by comparing the spectral characteristics of the suspected release pulse to the spectral characteristics of a plurality of known, reference release pulses.

Still another object of the present invention is to collect and store the spectral characteristics of a plurality of release pulses of actual three-way call signatures transmitted by recipient end office switches at different locations around the country.

Still another object of the present invention is to detect an attempted three-way call placement without requiring the physical presence of a special detection apparatus at the originator's location.

Still another object of the present invention is to detect attempted three-way call placements on a plurality of communication paths without requiring the presence of special detection apparatus at each originator location.

Still another object of the present invention is to improve three-way call detection accuracy by accounting for the effects of older telephone facilities, poor connections, and line loss due to the distance between the originator and recipient end office switches.

Still another object of the present invention is to increase the reliability and accuracy of three-way call detection.

Still another object of the present invention is to accurately detect an attempted three-way call placement when noise on a communication path would otherwise render difficult, if not impossible, the detection of a hook-flash event.

Other objects, features, and advantages of the present invention will become apparent upon reading and understanding the present specification when taken in conjunction with the appended drawings.

BRIEF DESCRIPTION OF THE DRAWINGS

FIG. 2 is a block diagram representation of a three-way call detector of the three-way call detection and response system of FIG. 1.

FIG. 4 is a block diagram representation of a program domain of the three-way call detection and response system of FIG. 1.

DETAILED DESCRIPTION OF THE PREFERRED EMBODIMENT

Figure 1:
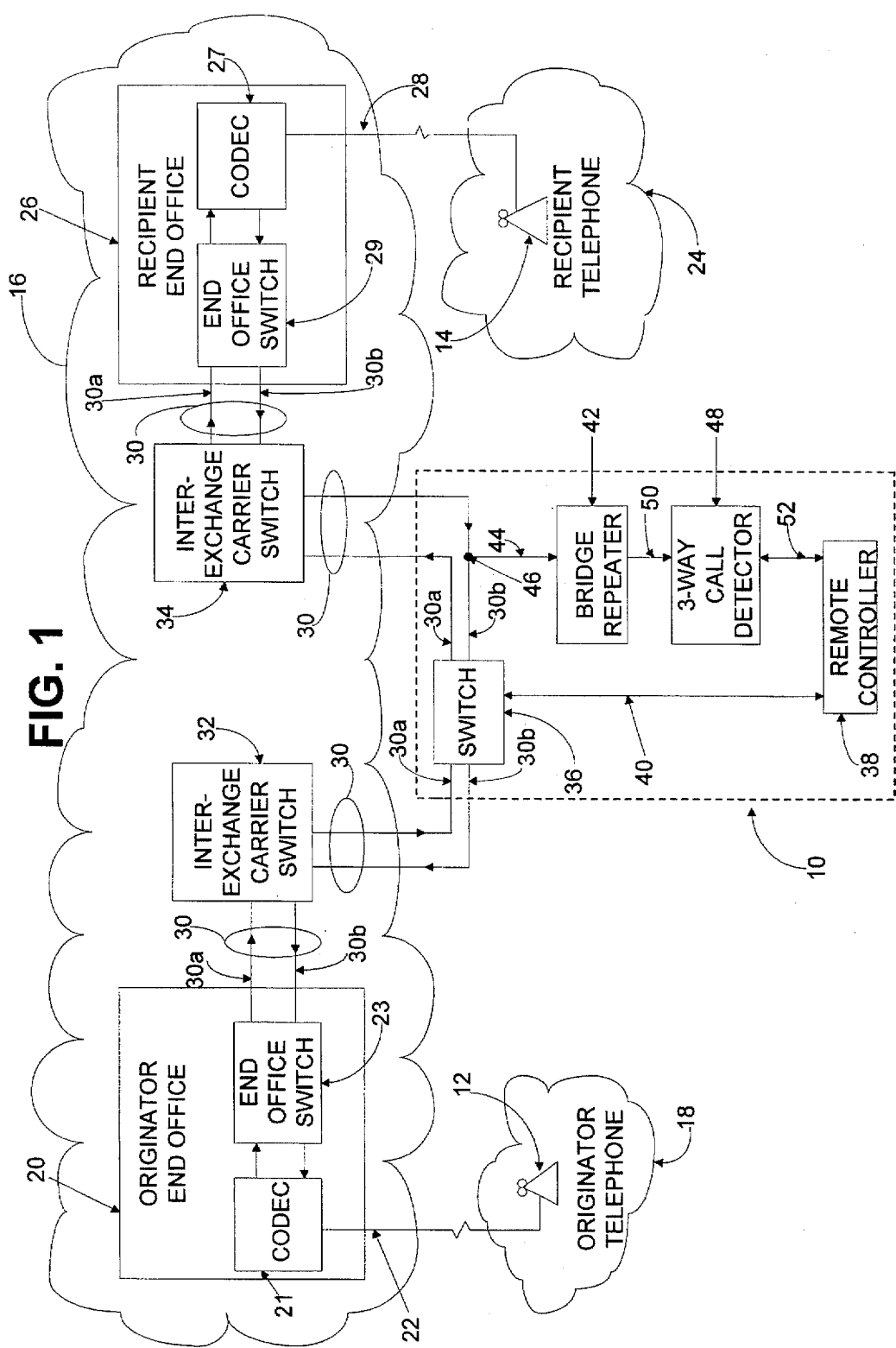
FIG. 1 is a block diagram representation of the physical domain of a three-way call detection and response system in accordance with a preferred embodiment of the present invention.

Referring now in greater detail to the drawings, in which like numerals represent like components throughout the several views, FIG. 1 displays a block diagram representation of the physical domain of a three-way call detection and response system 10 and associated components, in accordance with the preferred embodiment of the present invention. In the physical domain, the three-way call detection and response system 10, an originator telephone 12 and a recipient telephone 14 connect to the public switched network (PSN) 16. The originator telephone 12 is located at a first location (or premises) 18 and connects to a nearby originator end office 20 and, hence, the PSN 16 via analog distribution facilities 22. The analog distribution facilities 22 carry analog signals representing a human voice or other sounds between the originator telephone 12 and the originator end office 20. Typically, the analog distribution facilities 22 include two-wire loop start circuits. The recipient telephone 14 is located at a second location (or premises) 24, distant from the first location 18, and connects to a nearby recipient office 26 and, hence, the PSN 16 via analog distribution facilities 28. The analog distribution facilities 28 carry analog signals representing a human voice or other sounds between the recipient telephone 14 and the recipient end office 26. Typically, the analog distribution facilities 28 include two-wire loop start circuits.

Although illustrated by a single symbol, the originator telephone 12 represents a plurality of telephones available to one or more users at a first location 18 (or at multiple first locations 18). Similarly, the recipient telephone 14 represents a plurality of telephones available to one or more users at a second location 24 (or at multiple second locations 24). Also, the originator and recipient telephones 12,14 represent any of a large variety of currently known telephone stations, including, but not limited to, rotary, Dual Tone Multi-Frequency (DTMF), private telephone stations, smart telephone stations, and Private Branch Exchange (PBX) stations. In addition, the originator and recipient end offices 20,26 form an end office pair which is representative of multiple originator and recipient end office pairs, each of which, in part, telephonically links an originator telephone 12 at a first location 18 and a recipient telephone 14 at a second location 24. Each originator and recipient end office 20,26 also, preferably, includes a codec device 21,27 interposed between the respective analog distribution facilities 22,28 and a respective end office switch 23,29. The codec devices 21,27 are bi-directional devices which convert the analog signals carried by the analog distribution facilities 22,28 into pulse code modulated (PCM) digital signals used by the end office switches 23,29 and vice versa.

In accordance with the preferred embodiment as seen in FIG. 1, a communication path 30 extends between the originator end office 20 and the recipient end office 26 to carry the voice and sound energy of a telephone call between the originator telephone 12 and the recipient telephone 14. The communication path 30 is, preferably, a conventional T1facility carrying digital signals and includes two, one-way, digital communication paths 30a,30b extending between the originator end office 20 and the recipient end office 26 and passing through inter-exchange carrier switches 32,34. As denoted by the arrows, the first communication path 30a carries signals transmitted from the originator's end office switch 23 toward the recipient's end office switch 29, while the second communication path 30b carries signals transmitted from the recipient's end office switch 29 toward the originator's end office switch 23. It is understood that the communication path 30 represents multiple PCM communication paths (also referred to herein as channels) connecting pairs of originator and recipient telephones 12,14 (and pairs of originator and recipient end office switches 23,29) and carrying digital signals in a multiplexed DS1 format. It is also understood that all methods through which signals travel between the originator and recipient end office switches 23,29 are considered covered by the scope of the present invention. It is further understood that the PSN 16 includes a great variety of interconnecting switches, including other end office switches (also known as local exchange carrier central office (LEC CO) switches), access tandem switches, and long distance carrier points of presence switches and that the communcation path 30 may be routed through many such switches in order to couple the originator end office switch 23 and the recipient end office switch 29. LEC's are understood to include, but are not limited to, Regional Bell Operating Companies (RBOC's) and the Independent Telephone Companies (ITC's).

The three-way call detection and response system 10, as displayed in FIG. 1, is located outside the PSN 16 at a position distant from the originator and recipient end office switches 23,29 and, preferably, includes a conventional telephony switch 36 through which communication path 30 is also routed. One example, but without limitation, of an acceptable switch 36 is a Model SDS-1000 available from Summa Four, Inc. of Manchester, N.H. In an alternate embodiment, the switch 36 is a Model 20/20 available from Harris Corporation of Melbourne, Fla. The switch 36 enables special handling of telephone calls which are routed through the switch 36 by the inter-exchange carrier switches 32,34 based in part upon the telephone number assigned to the originator telephone 12. For instance, a telephone call made from a telephone number assigned to an originator telephone 12 located at a prison (i.e., a first location 18) may be routed through switch 36 to enable special handling of the telephone call including, but not limited to, termination (or disconnection) of the telephone call, playback of a recording to the call's originator and recipient, and operator intervention. The three-way call detection and response system 10 further includes a remote controller 38 which electrically connects to the switch 36 via a control line 40. Preferably, signals are carried by control line 40 in an ethernet protocol. In an alternate embodiment of the present invention, the remote controller 38 connects to a switch of the PSN 16 located between end office switches 23,29, thereby eliminating switch 36. The remote controller 38 executes a number of software applications, as described below, which cause the remote controller 38 to send various commands (i.e., control signals) to switch 36 (or, in alternate embodiments, to a switch of the PSN 16) which control, at least, the connection, disconnection, and routing of telephone calls through switch 36 (or, in the alternate embodiments, control a switch of the PSN 16).

In accordance with the preferred embodiment, the three-way call detection and response system 10 also includes a bridge repeater 42 which connects electrically, in a non-intrusive manner, to communication path 30b via signal line 44 at a location 46 between switch 36 and inter-exchange carrier switch 34 and, hence, distant from the locations 18,24 of the originator and recipient telephones 12,14. The bridge repeater 42 functions as a conventional bridge repeater and taps signals from communication path 30b without substantial degradation of the digital signals carried by communication path 30b. One example, without limitation, of an acceptable bridge repeater 42 is a Larus 1109 available from Larus Corporation and is capable of handling at least 24 PCM channels. It is understood that other apparatus and methods of non-intrusively acquiring digital signals from communication path 30b are within the scope of the present invention. Communication path 30b and, hence, signal line 44 carry multiple PCM channels of digital voice and sound energy multiplexed in a DS1 format and the bridge repeater 42 amplifies and retimes the digital signals transported by each channel. The three-way call detection and response system 10 further includes, as seen in FIG. 1, a three-way call detector 48 interposed electrically between the bridge repeater 42 and the remote controller 38. The three-way call detector 48 connects electrically to the bridge repeater 42 via a signal line 50 and to the remote controller 38 via a control line 52. Signal line 50, similar to signal line 44, carries multiple PCM channels of digital voice and sound energy multiplexed in a DS1 format. Control line 52 carries control signals bi-directionally between the three-way call detector 48 and the remote controller 38 using, preferably, an ethernet protocol. It is understood that the scope of the present invention includes other methods of connecting the three-way call detector 48 to the PSN 16 to acquire digital signals carried by communication path 30b.

FIG. 2 displays a block diagram representation of the three-way call detector 48 in accordance with the preferred embodiment of the present invention. Preferably, the three-way call detector 48 includes an interface 54, a digital signal processor 56, and a local controller 58. The interface 54 is electrically interposed between the bridge repeater 42 and the digital signal processor 56 and connects electrically to the bridge repeater 42 via signal line 50. The interface 54, having multiple output ports, functions, as readily understood by one skilled in the art, to demultiplex the DS1 channels 30 (or as also referred to herein, communication paths 30) present on signal line 50 and to make each channel's digital signals available in PCM format at an output port for selection and routing on signal line 60 to the digital signal processor 56. One example, without limitation, of an acceptable interface 54 is a T1 interface card available from Brite Corporation of Wichita, Kans. Control line 62 electrically connects the interface 54 and the local controller 58 to enable the bi-directional transfer of control signals between the interface 54 and the local controller 58. Preferably, the control line 62 carries control signals in RS-232 protocol. An acceptable alternative protocol is the ethernet TCP/IP protocol. Similarly, control line 64 electrically connects the digital signal processor 56 and the local controller 58 to enable the bi-directional transfer of control signals between the digital signal processor 56 and the local controller 58. Preferably, the control line 64, similar to control line 62, carries control signals in RS-232 protocol. An acceptable alternative protocol is the ethernet TCP/IP protocol. The digital signal processor 56 includes an internal memory 57 and, as discussed below, stores previously collected spectral characteristics of a plurality of known pulses of three-way call signatures. The local controller 58 electrically connects to the remote controller 38 via control line 52 for bi-directional transfer of control signals between the local controller 58 and the remote controller 38. Such control signals include incoming commands received and interpreted by the local controller 58 and outgoing signals announcing the detection of an attempted three-way call placement to the remote controller 38. One example, without limitation, of an acceptable local controller 58 is a PS-01-0000 central processing unit (CPU) available from Brite Corporation of Wichita, Kans. It is understood that the interface 54, digital signal processor 56, and local controller 58 are representative of multiple interfaces 54, digital signal processors 56, and local controllers 58 which may be utilized in the three-way call detection and response system 10.

The local controller 58 receives textual commands from the remote controller 38 to control the operation of the interface 54 and digital signal processor 56. Upon interpreting the received commands, the local controller 58 generates the appropriate control signals necessary to carry out the commands and transmits the control signals to the interface 54 and digital signal processor 56 via control lines 62,64, respectively. Typical commands include, at least, commands which cause reinitialization of the interface 54 and digital signal processor 56, selection of an interface port for direction of a channel's PCM digital signal to the digital signal processor 56, and initiation of three-way call detection by the digital signal processor 56. Once an interface port and, hence, a communication path 30b is selected for monitoring, as discussed below, the digital signal processor 56 discretely samples the digital signals, carried by communication path 30b from the recipient's end office 26 to the originator's end office 20, to detect the existence of three-way call signature indicia potentially present in the digital PCM signal. Upon detecting indicia representative of a three-way call signature (and, hence, an attempted three-way call placement), the digital signal processor 56 generates a control signal which it sends to the local controller 58 on control line 64. In response, the local controller 58 generates and sends a control signal to the remote controller 38 along control line 52 to inform the remote controller 38 that an attempted three-way call placement has been detected on a selected interface port and communication path 30b. One example, without limitation, of an acceptable three-way call detector 48 is manufactured by Brite Corporation of Wichita, Kans.

Figure 3:
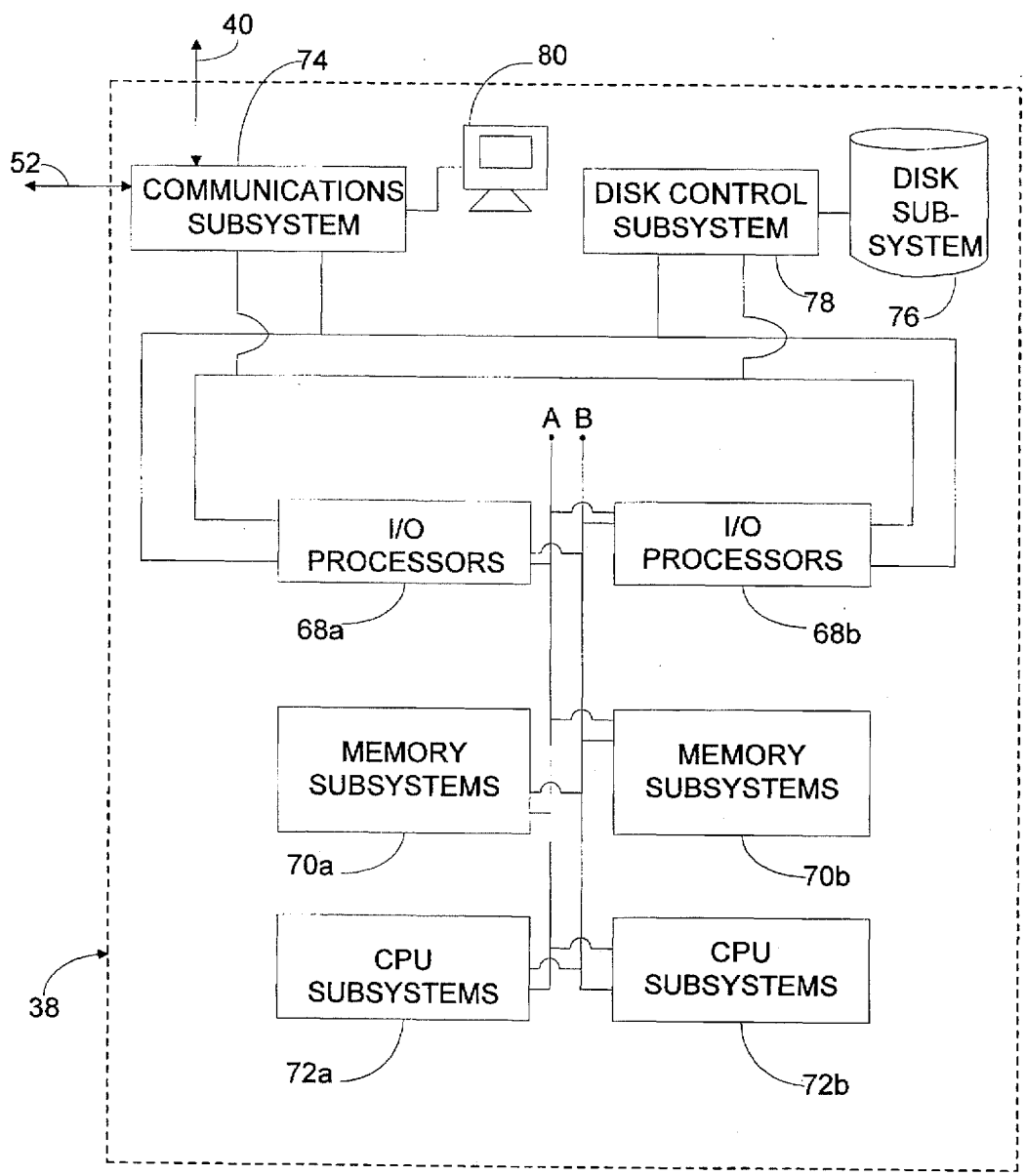
FIG. 3 is a block diagram representation of a remote controller of the three-way call detection and response system of FIG. 1.

FIG. 3 displays a block diagram representation of the remote controller 38 of FIG. 1. In accordance with the preferred embodiment, the remote controller 38 is a fault tolerant, general purpose controller which is appropriately programmed (see below) and which offers utility grade service from a redundant architecture which is capable of processing many applications simultaneously. One example, without limitation, of an acceptable remote controller 38 is a Stratus® XA2000 Model 30 from Stratus Computer, Inc. of Marlboro, Mass. As seen in FIG. 3, two buses, A & B, are both electrically connected to redundant, mirror-image hardware components, including I/O processors 68a,68b, memory subsystems 70a,70b, and CPU subsystems 72a, 72b. I/O processors 68a,68b are both electrically connected to communications subsystem 74 and to disk subsystem 76 through disk control subsystem 78. Control lines 40,52 electrically connect the communications subsystem 74 to switch 36 and the three-way call detector 48, respectively. A terminal 80 also electrically connects to communications subsystem 74.

The redundant architecture of the remote controller 38 insures continuous application reliability and availability. If one component fails, its redundant, mirror-image component typically continues so that there are normally two components performing the same function at the same time. Also, each CPU subsystem 72a,72b contains duplicate CPU's which process the same data at the same time, thus a total of four processors typically work on the same data at the same time. Logic comparators continually compare the results of each processor. If the processors on a board disagree, that particular board is taken off line, an error signal is generated, and its redundant, mirror-image component continues without any processing degradation.

The operation of each component of the remote controller 38 is relatively straight forward to one reasonably skilled in the art. CPU subsystems 72 provide processor functions; memory subsystems 70 provide operating memory; and I/O processors 68 provide input and output capabilities. Disk control subsystem 78 provides control of disk subsystem 76, which stores conventional operating system programming, application programming, and data tables. Control lines 40,52 enable bi-directional communication with switch 36 and three-way call detector 48, respectively. Terminal 80 provides human interaction with the remote controller 38 through communications subsystem 74.

FIG. 4 is a block diagram representation of the program domain of the three-way call detection and response system 10 in accordance with the preferred embodiment of the present invention. In the preferred embodiment, the programming domain represents programming found, in large part, on the remote controller 38. Running below a virtual operating system 82 are a switch server 84 and a three-way call detect server 86. The switch server 84 and three-way call detect server 86 are multi-tasking, multi-threading processes which provide programming interfaces between the remote controller 38 and the switch 36 and the remote controller 38 and the three-way call detector 48, respectively. The three-way call detect server 86 has access, via disk control subsystem 78, to a configuration table 90 and an event log table 92 present on disk subsystem 76. The configuration table 90 stores data including, at least, the number of interface ports available for three-way call detection, the type of response to employ upon detection of an attempted three-way call placement, and recorded messages to be played back in conjunction with a response. The event log table 92 stores data related to an attempted three-way call placement including, at least, the date and time of the attempt and the telephone numbers of the originator telephone 12 and recipient telephone 14. Both the switch server 84 and the three-way call detect server 86 are connected to a call processing application 88 which has access, via the disk control subsystem 78, to a port mapping table 94 residing on the disk subsystem 76. The port mapping table 94 stores data including data which identifies the ports of interface 54 which are in use at a given time. The call processing application 88 communicates with the switch server 84 and the three-way call detect server 86 through interprocess communication paths represented in FIG. 4 as connecting lines extending between the servers 84,86 and the call processing application 88.

In accordance with a preferred embodiment of the method of the present invention, the three-way call detection and response system 10 stores spectral characteristics (including, but not limited to the combination of duration time, frequency, and amplitude) of a plurality of release pulses 106 of sample three-way call signatures 100 (see FIG. 9) created by the making of sample three-way calls from recipient telephones 14 at different recipient locations 24. The spectral characteristics, collected and stored prior to the actual day to day operation of the three-way call detection and response system 10, are employed by the digital signal processor 56 as reference characteristics of known release pulses 106 in a comparison and pattern matching step, as discussed below, to identify whether or not a suspected release pulse is actually the release pulse 106 of a suspected three-way call signature 100. Use of the plurality of sample release pulses 106 and monitoring of communication path 30b between end office switches 23,29 is necessary to enable more accurate detection of three-way call signatures 100 by allowing the system 10 to account for differences in line loss attributable to older facilities, poor connections, and distances between the originator telephone location 18 and the recipient telephone location 24, in addition to noise possibly created by an originator attempting to mask a three-way call placement.

Figure 5:
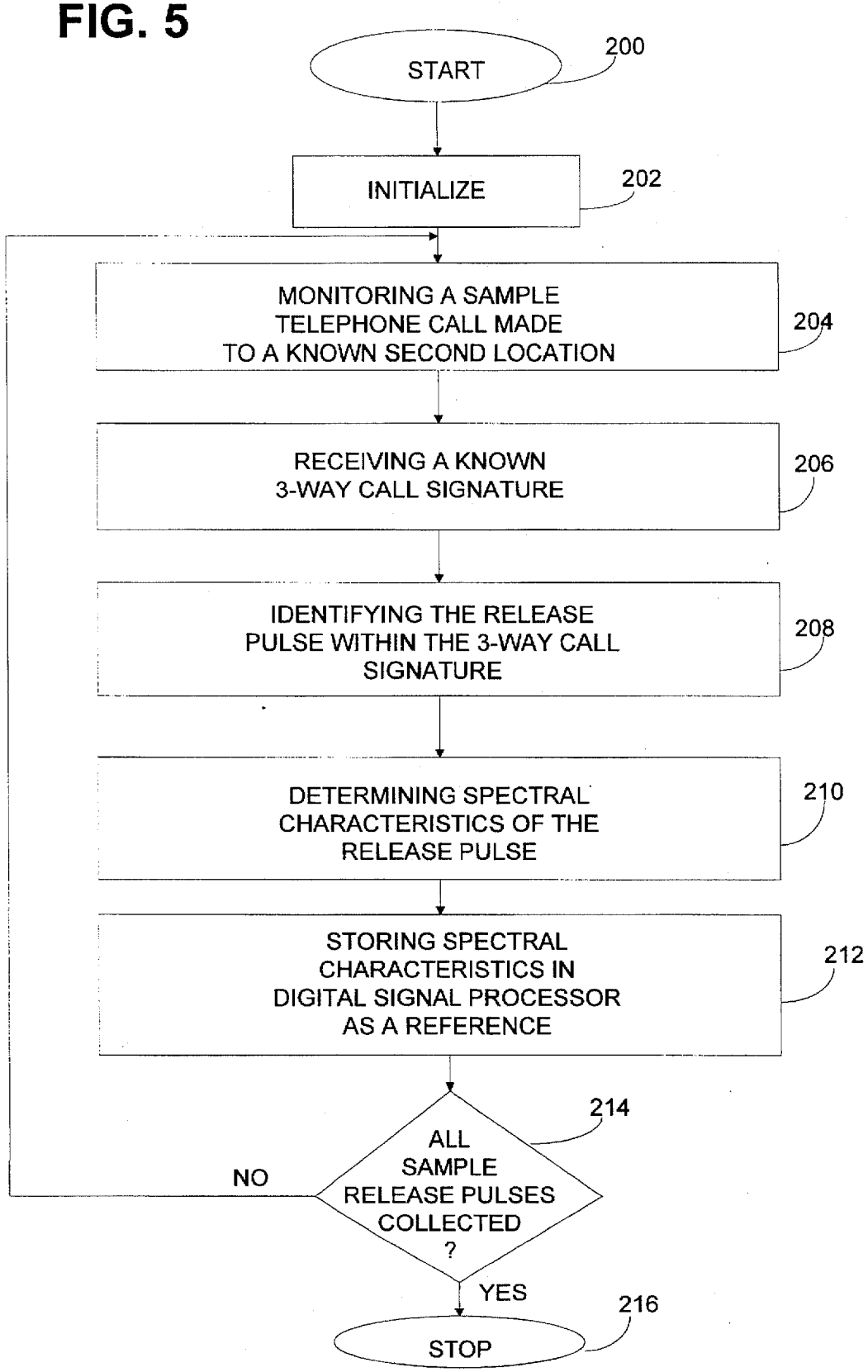
FIG. 5 is a flow chart representation of a method for collecting and storing spectral characteristics of known, reference release pulses in accordance with a preferred method of the present invention.
Figure 9:
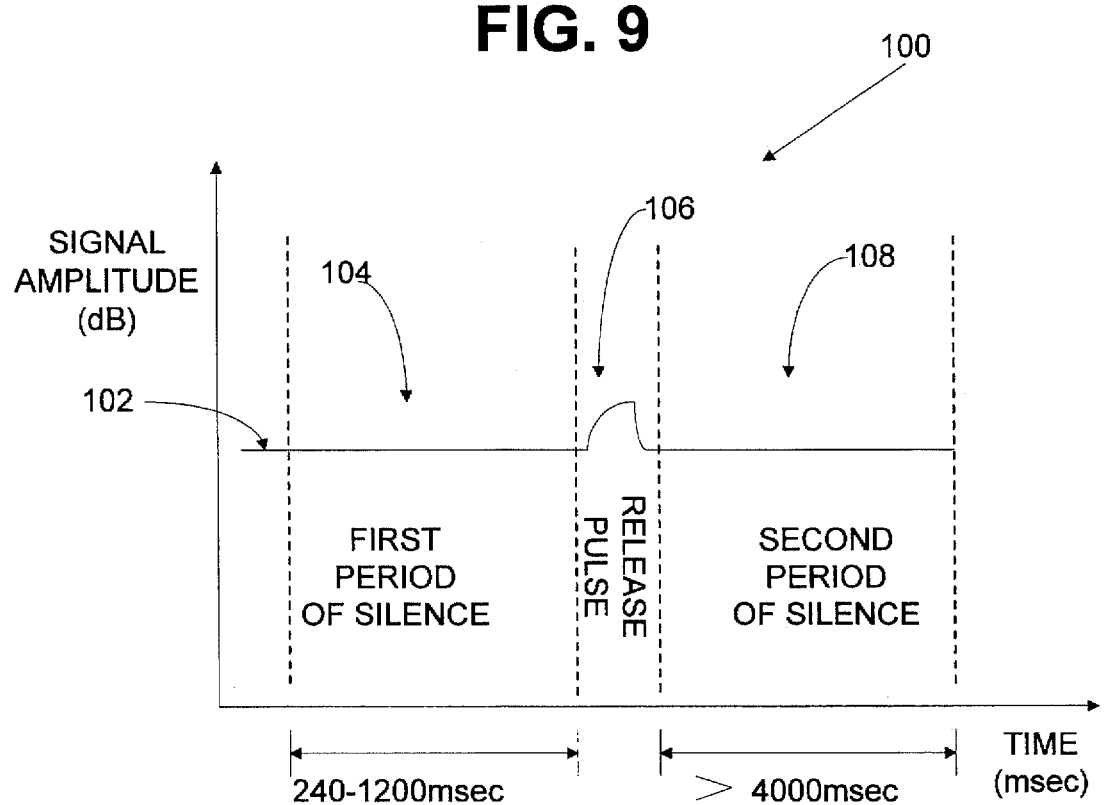
FIG. 9 is a graphical representation of a three-way call signature in accordance with the preferred method of the present invention.

The preferred embodiment of the invented method, seen in the flow chart representation of FIG. 5, begins at step 200 and moves to step 202 where the digital signal processor 56 and other components are initialized for collection of the spectral characteristics of sample release pulses 106. At step 204, the digital signal processor 56 monitors a telephone call, made to a known recipient location 24, by discretely sampling the digital signals carried by communication path 30b. Upon release of the switch hook on the recipient's telephone 14 (i.e., thereby creating a known three-way call signature 100 including a release pulse 106 as seen in FIG. 9), the digital signal processor 56, at step 206, receives the signal 102 and, hence, the three-way call signature 100 carried by communication path 30b from the recipient end office switch 29 toward the originator end office switch 23. Advancing to step 208, the digital signal processor 56 identifies the release pulse 106 present in the three-way call signature 100 and, at step 210, analyzes the release pulse 106 to determine its spectral characteristics. At step 212, the spectral characteristics of the release pulse 106 are stored in the digital signal processor 56 for use as a reference in the subsequent detection of release pulses 106 of actual three-way call signatures 100. The method, at step 214, determines whether or not all sample release pulses 106 have been collected. If yes, the method proceeds to step 216 where it stops. If no, the method proceeds to step 204 where it monitors a telephone call made to a different recipient location 24, thereby enabling the collection and storage of spectral characteristics for a plurality of reference release pulses 106 which are created by recipient telephones 14 at different recipient locations 24.

Figure 6:
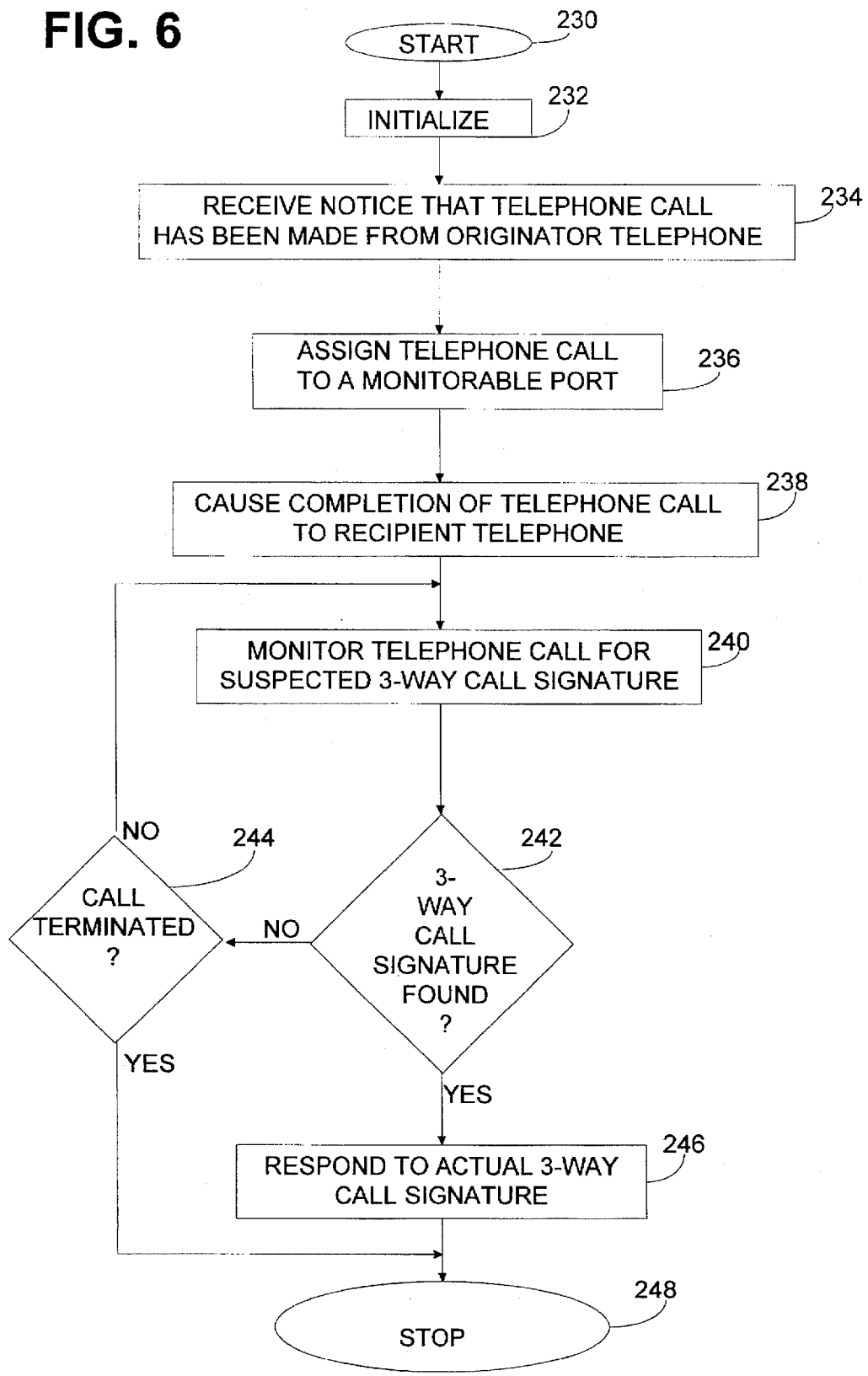
FIG. 6 is a flow chart representation of a method for detecting and responding to a three-way call signature in accordance with the preferred method of the present invention.
Figure 7A:
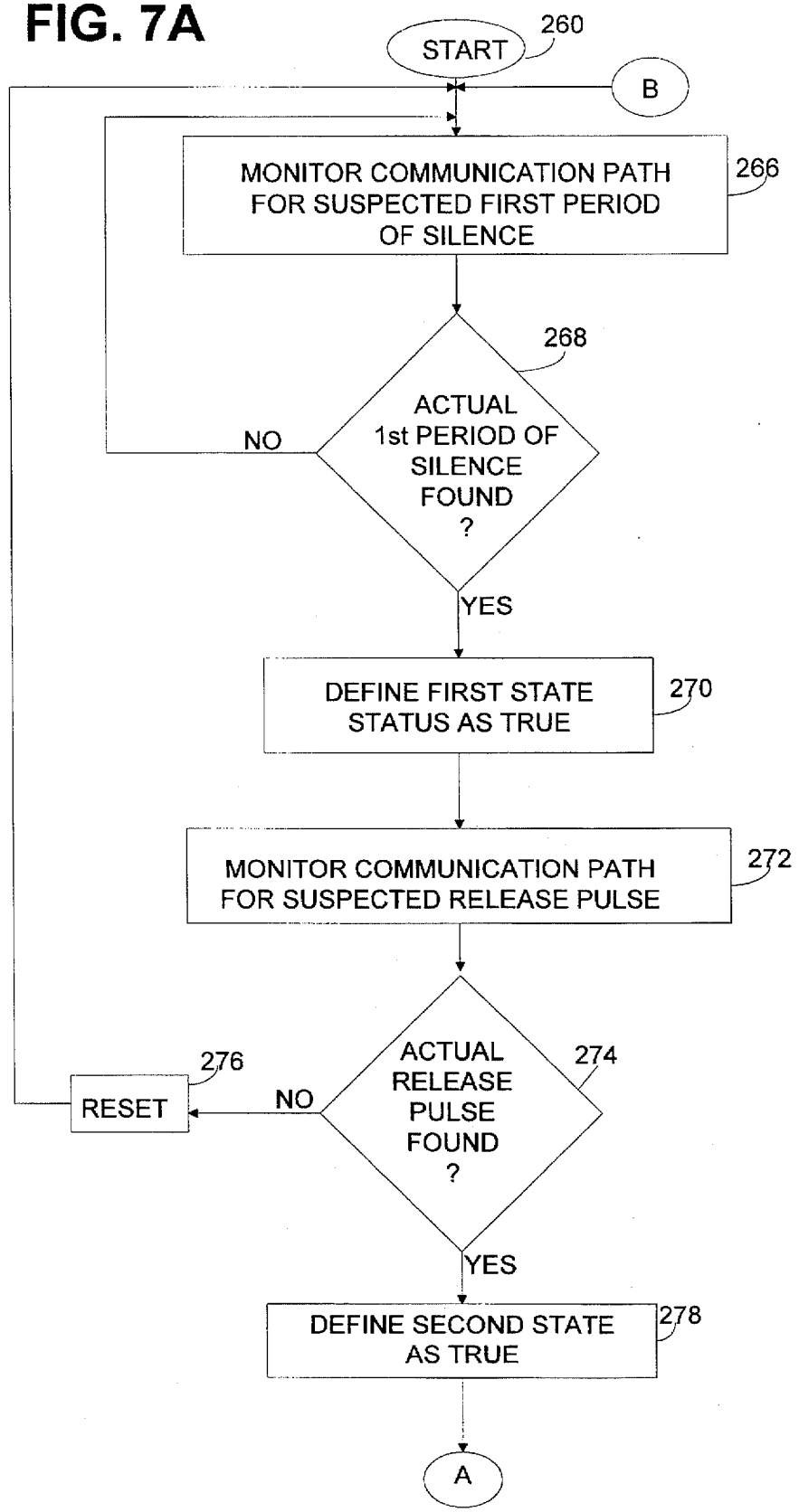
FIG. 7 is a flow chart representation of a method for detecting indicia representative of a three-way call signature in accordance with the preferred method of the present invention.
Figure 7B:
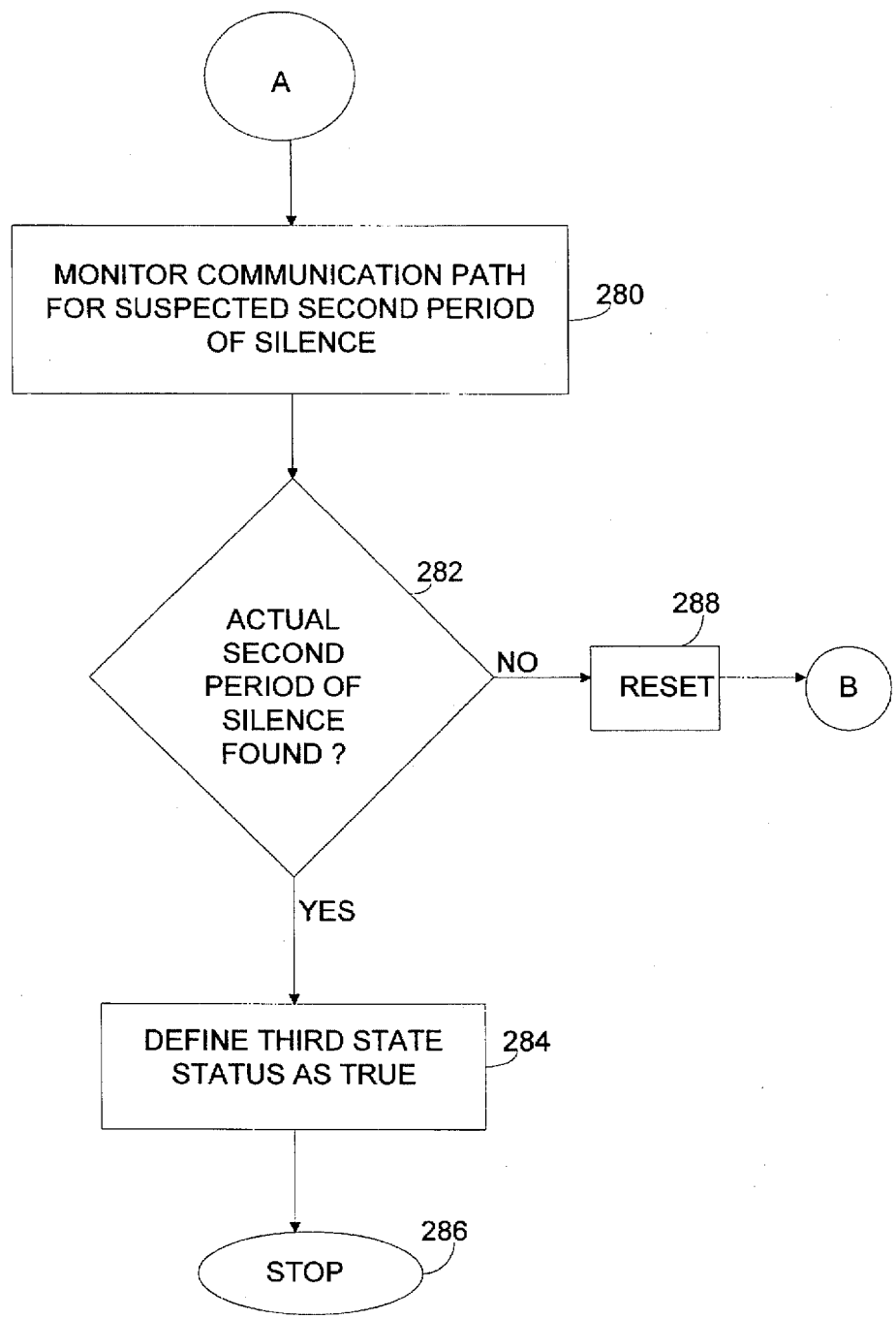
Figure 8:
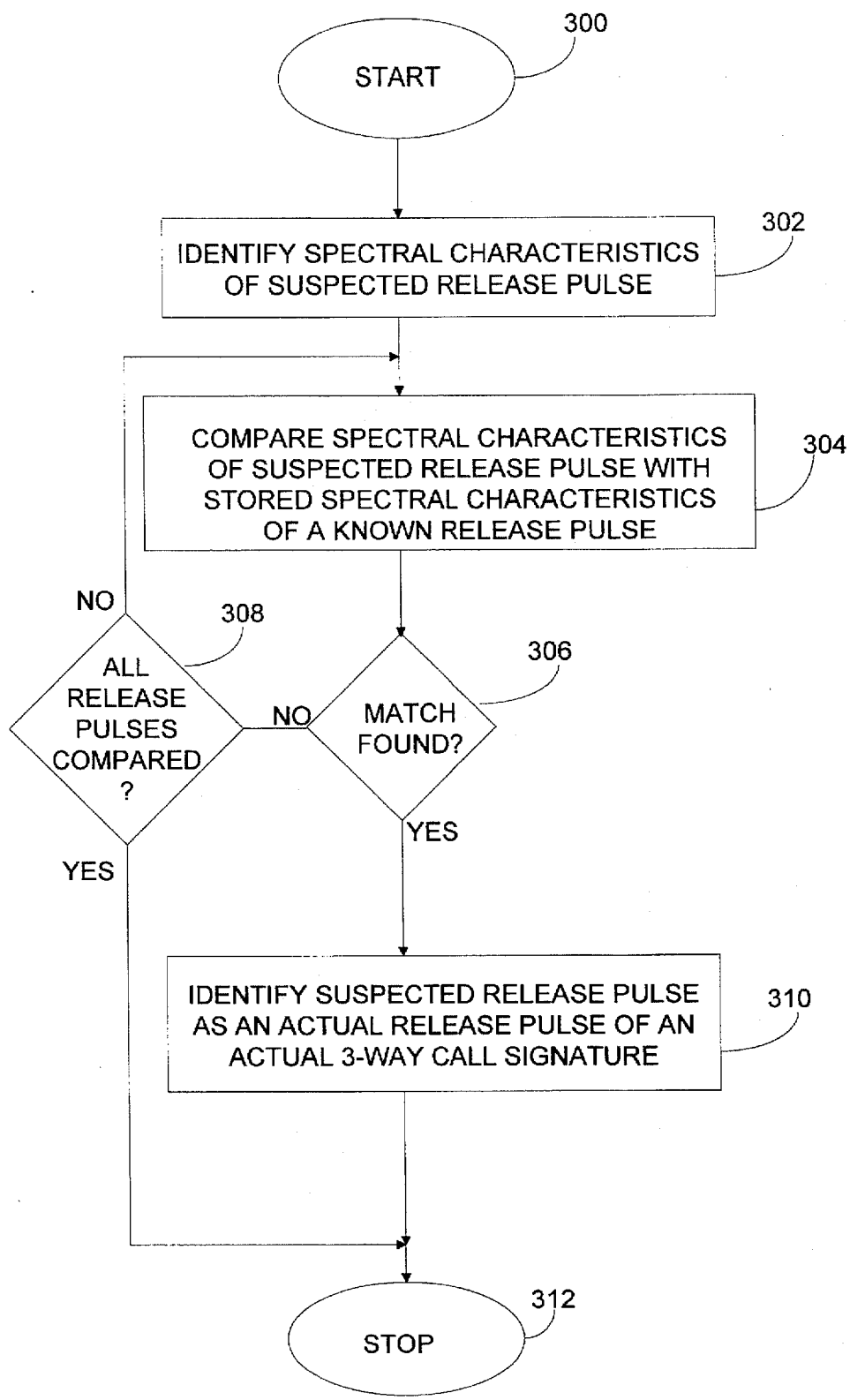
FIG. 8 is a flow chart representation of a method for identifying a release pulse of an actual three-way call signature in accordance with the preferred method of the present invention.

FIGS. 6-8 are flow chart representations of steps taken by the three-way call detection and response system 10 of the preferred embodiment of the present invention when executing a three-way call detection process, such as is suitable for many penal environments. Refer to the previous figures when references are made to components previously discussed.

The three-way call detection and response process, as seen in FIG. 6, starts at step 230 and moves to step 232 where the system 10 is initialized. After initialization, the system 10 waits for an originator, such as an inmate, to use an originator telephone 12 to place a telephone call to a recipient telephone 14 by dialing the number associated with the recipient telephone 14. Upon identification of the telephone call as one requiring monitoring (i.e., by analysis of the origination number and dialed destination number by the switches of the public switched network 16), switch 36, at step 234, receives the telephone call which has been routed to switch 36 by the other switches of the PSN 16 and, using a predefined format to signal the remote controller 38 on control line 40, switch 36 notifies the remote controller 38 that a call requiring monitoring is present at the switch 36. One example, without limitation, of an acceptable format is the Feature Group D protocol which is well-known to those reasonably skilled in the art. Advancing to step 236, the telephone call is assigned (or mapped) to a monitorable port of the three-way call detector 48 as described in the following discussion. The remote controller 38 receives the control signal from the switch 36 and passes it to the switch server 84 which, in response, requests that the call processing application 88 make a port assignment. The call processing application 88 requests identification of an available port from the three-way call detect server 86 which accesses the configuration table 90 to determine whether or not an interface port is available for use. Upon determining that a port is available, the three-way call detect server 86, via the remote controller 38 and control line 52, commands the local controller 58 to initialize the port for monitoring. The three-way call detect server 86 provides port identification data for the available port to the call processing application 88 which assigns (or maps) the call to the port and updates the port mapping table 94. The call processing application 88 instructs the remote controller 38 to signal the switch 36 via control line 40 to complete the telephone call. Upon completion of the telephone call and establishment of communication path 30 at step 238, the switch 36 signals the remote controller 38, via control line 40, to inform the switch server 84 that the telephone call has been completed. The switch server 84 passes the call's status on to the call processing application 88 which instructs the three-way call detect server 86 to begin monitoring the call. The three-way call detect server 86 transmits a command, via control line 52, to the local controller 58 to select the assigned port and to initiate monitoring of the port by the digital signal processor 56.

The digital signal processor 56, at step 240, monitors the digital signals which are transmitted from the recipient's end office 26 to the originator's end office 20 on communication path 30b and which are ported to signal line 60 by the bridge repeater 42 and interface 54 to detect indicia representative of an attempted three-way call placement 100 (i.e., a three-way call signature 100). The indicia 100 include, as displayed in FIG. 9, a first period of silence 104, a release pulse 106, and a second period of silence 108 in series. Preferably, the digital signal processor 56 searches, by applying discrete sampling techniques well-known in the field of digital signal processing to the digital signals 102, for a first period of silence 104 lasting for a duration of 240 milliseconds to 1.2 seconds at a signal amplitude below −47 dbm. Similarly, the digital signal processor 56 searches for a second period of silence 108 lasting, preferably, for a duration of at least 4 seconds at a signal amplitude also below −47 dbm. The digital signal processor 56 also searches for a release pulse 106 having, preferably, spectral characteristics (including a minimum amplitude of −23 dbm) substantially similar to the spectral characteristics of a known release pulse 106 previously collected and stored in the digital signal processor 56 for use as a reference. The method of operation of the digital signal processor 56 is described in more detail below.

Upon determining, by checking the three state statuses 110,112,114 (described below) at step 242, that an actual three-way call signature 100 (and, hence, an attempted three-way telephone call placement) has been detected, the digital signal processor 56 signals the local controller 58 by placing an appropriate control signal on control line 64. The local controller 58, in response, places an appropriate control signal on control line 52 to inform the remote controller 38 and, hence, the call processing application 88 that an attempted three-way call placement has been detected by the three-way call detector 48 on a specified port. The call processing application 88 responds by informing the three-way call detect server 86 that an attempted three-way call placement has been detected on the port. The three-way call detect server 86 accesses the configuration table 90 in order to determine how to handle the detected three-way call attempt. Based upon information in the configuration table 90, the three-way call detect server 86 responds to the attempted three-way call placement, at step 246, by performing one or more steps including, but not limited to: (1) notifying switch 36, via control line 40, to disconnect the communication path 30 and, hence, the telephone call between the originator's telephone 12 and the recipient's telephone 14; (2) playing a recorded announcement to the originator and recipient telephones 12,14; (3) storing a record of the attempted three-way telephone call placement in the event log table 92; (4) performing any combination of the steps of notifying, playing, and storing described in 1–3 above; and, (5) ignoring the detection of the attempted three-way telephone call placement. It is understood that other methods of response to the detection of an attempted three-way telephone call placement are within the scope of the present invention. After responding at step 246, the method stops monitoring the call at step 248. If no three-way call signature 100 is found at step 242 (i.e., at least one state status 110,112,114 is false), the method periodically checks to see, at step 244, whether or not the call has terminated. If no, the method continues monitoring at step 240. If yes, the method stops monitoring at step 248.

Figure 10:
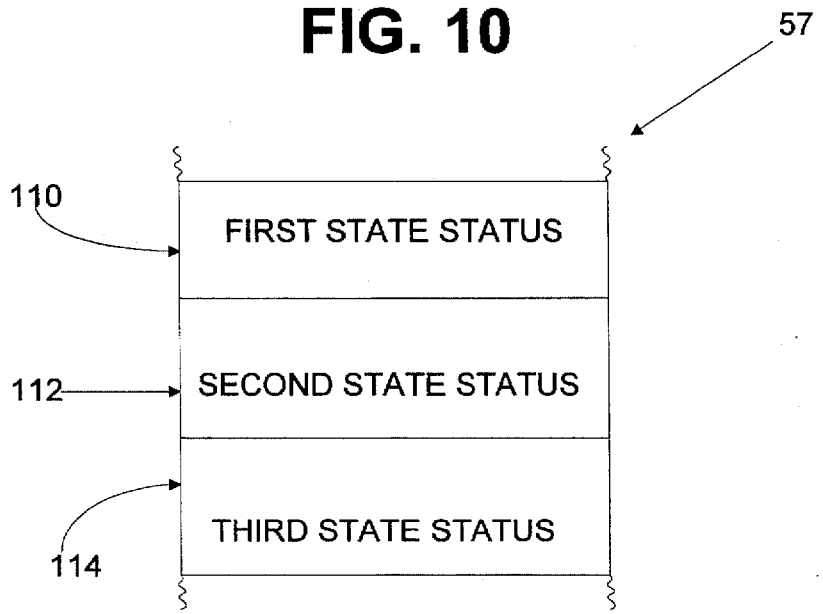
FIG. 10 is a schematic representation of a memory having storage locations for a plurality of state status values in accordance with the preferred method of the present invention.

In accordance with the preferred method of the present invention, the digital signal processor 56, as illustrated in FIGS. 7 and 8, operates as a state machine defining, preferably, three states (or conditions), corresponding to the indicia representative of an attempted three-way call placement 100, which must have a true status in order for the system 10 to conclude that the recipient has attempted to place a three-way telephone call. A first state, having a status 110 (see FIG. 10), represents whether or not an actual first period of silence 104 has been found. For the first state status 110 to be true, the digital signal processor 56 must detect the existence of a period of silence meeting the requirements described above for the first period of silence 104. A second state, having a status 112 (see FIG. 10), represents whether or not an actual release pulse 106 has been found. For the second state status 112 to be true, the digital signal processor 56 must detect the presence of a release pulse, after the first period of silence 104, having a minimum amplitude of −23 dbm and spectral characteristics substantially similar to the spectral characteristics of, at least, one of the plurality of reference release pulses 106 previously collected and stored in accordance with the preferred method. A third state, having a status 114 (see FIG. 10), represents whether or not an actual second period of silence 108 has been found. For the third state status 114 to be true, the digital signal processor 56 must detect a period of silence following the pulse 106 and meeting the requirements described above for the second period of silence 108. If all three states have a true status 110,112,114, the digital signal processor 56 determines that an actual three-way call signature has been found (and, hence, that an attempted three-way call placement has been found) because all of the indicia 100 are present. If all three states do not have a true status 110,112, 114 (i.e., at least one state is false), the digital signal processor 56 determines that the suspected three-way call signature is not an actual three-way call signature (and, hence, that an attempted three-way call placement has not occured) because one of the indicia 100 is not present.

The digital signal processor 56, in accordance with the preferred method and as displayed in FIG. 7, starts a detection process at step 260 and advances to step 266 where the digital signal processor 56 monitors the digital signals which are carried by communication path 30b and ported to signal line 60 by sampling and analyzing the digital signals. The sampling techniques and analysis methods of the digital signal processor 56 are considered to be well-known to those reasonably skilled in the art and are, therefore, not discussed herein. The digital signal processor 56 monitors the digital signals on communication path 30b for the existence of a period of silence which it suspects as being the first period of silence 104 (see FIG. 9) of a suspected three-way call signature 100. Upon detecting a suspected first period of silence at step 266, the digital signal processor 56 determines, at step 268, whether or not the suspected first period of silence meets the requirements set forth above for the first period of silence 104 of an actual three-way call signature. If no, the method retreats to step 266 to continue searching for a suspected first period of silence. If yes, the method identifies the period of silence as the first period of silence 104 of an actual three-way call signature and, at step 270, defines the first state status 110 to be true. The method continues, at step 272, where the digital signal processor 56 monitors the digital signals on signal line 60, using the steps shown in FIG. 8, for the presence of a suspected release pulse having a minimum amplitude of −23 dbm. To determine, at step 274, whether or not the suspect release pulse is an actual release pulse 106 indicative of an attempted three-way call placement, the digital signal processor 56 identifies the spectral characteristics of the suspected release pulse and compares the spectral characteristics to the reference characteristics of known release pulses which were previously collected and stored as described above. Details of the comparison and pattern recognition method are discussed below. If the spectral characteristics of the suspected release pulse does not sufficiently match the spectral characteristics of one of the plurality of known release pulses, then the method resets the first state status 110 to false at step 276 and loops back to step 266 to begin searching for a suspected first period of silence. If, on the other hand, the spectral characteristics of the suspect release pulse sufficiently match the spectral characteristics of, at least, one of the plurality of known release pulses, then the digital signal processor 56 identifies the suspected release pulse as an actual release pulse 106 of an actual three-way call signature and, at step 278, defines the second state status 112 to be true.

Continuing at step 280, in accordance with the preferred method, the digital signal processor 56 begins monitoring the digital signals present on signal line 60 for a period of silence meeting the above described specifications for a second period of silence 108 of a three-way call signature. At step 282, the digital signal processor determines whether or not a suspected second period of silence is actually a second period of silence 108 indicative of a three-way call signature 100. If yes, the digital signal processor 56 identifies the suspected second period of silence as an actual second period of silence 108 and, at step 284, defines the third state status 114 to be true. The method then terminates with respect to the monitored telephone call at step 286. If no, the method, at step 288, resets the first and second state statuses 110,112 to be false and returns to step 266 to begin monitoring for a suspected first period of silence. It is understood that the apparatus of the present invention is capable, in effect, of monitoring multiple telephone calls simultaneously and that the termination of monitoring one telephone call does not terminate monitoring of other telephone calls. Also, it is understood that termination of the monitored telephone call causes termination of monitoring for that call.

FIG. 8 displays the detailed method steps which the system 10 employs, at step 274, to determine whether or not a suspected release pulse is actually the release pulse 106 of a three-way call signature 100. In accordance with the preferred method, the process starts at step 300 and proceeds to step 302 where the digital signal processor 56 discretely samples (using sampling techniques well-known to those reasonably skilled in the art) the suspected release pulse in order to identify its spectral characteristics. Then, at step 304, the digital signal processor 56 compares the identified spectral characteristics of the suspected release pulse with the stored spectral characteristics of a known release pulse 106 collected from one of the plurality of different, sample recipient telephone locations 24 as discussed above. The digital signal processor 56 utilizes techniques similar to those employed in speech or pattern recognition systems to compare the spectral characteristics of the suspected release pulse and the known release pulse 106. At step 306, the digital signal processor 56 determines whether or not the spectral characteristics are substantially similar. If no, then the suspected release pulse is not considered to be an actual release pulse 106 of a three-way call signature 100 and the method, at step 308, checks to see if the spectral characteristics of the suspected release pulse have been compared against all of the stored spectral characteristics for all of the known release pulses 106. If no, the method loops back to step 304 and compares the spectral characteristics of the suspected release pulse against the stored spectral characteristics of a different, known, release pulse 106. If yes, the method stops at step 312. If, at step 306, a match is found between the spectral characteristics of the suspected release pulse and the known release pulse 106, the method, at step 310, identifies the suspected release pulse as an actual release pulse 106 of an actual three-way call signature 100. The method then stops at step 312.

Whereas this invention has been described in detail with particular reference to its most preferred embodiment, it is understood that variations and modifications can be effected within the spirit and scope of the invention, as described herein before and as defined in the appended claims. The corresponding structures, materials, acts, and equivalents of all means or step plus function elements in the claims below are intended to include any structure, material, or acts for performing the functions in combination with other claimed elements as specifically claimed.

We claim:

1. A method of processing a telephone call, said method comprising the steps of:
   identifying a first location as a location requiring monitoring;
   establishing a communication path to allow monitoring;
   mapping the communication path to a port of a monitoring apparatus;
   monitoring the communication path connecting a telephone call originator at the first location and a telephone call recipient at a second location to detect an attempted three-way telephone call placement by the telephone call recipient, wherein monitoring is performed at a location distant from the first location, and
   upon detection of an attempted three-way telephone call placement, responding in a predetermined manner.

2. The method of claim 1, wherein the step of monitoring includes, at least, monitoring the communication path to detect indicia representative of a three-way call signature.

3. The method of claim 1, wherein the step of monitoring includes, at least, comparing spectral characteristics of a suspected release pulse of a suspected three-way call signature to spectral characteristics of a known release pulse of a known three-way call signature to detect transmission of a three-way call signature on the communication path.

4. The method of claim 1, wherein the step of monitoring includes, at least, monitoring a communication path directing a plurality of digital signals between the telephone call recipient and the telephone call originator.

5. The method of claim 1, wherein the step of monitoring includes, at least, monitoring a communication path carrying a plurality of signals traveling only in a single direction from the telephone call recipient to the telephone call originator.

6. The method of claim 1, wherein the step of monitoring includes, at least, observing a signal traveling on the communication path absent interruption of the signal.

7. The method of claim 1, wherein the step of monitoring includes, at least, monitoring a communication path established between a first telephone switch and a second telephone switch at a position between the first and second telephone switches, wherein the first and second telephone switches are located distant from the first location.

8. The method of claim 1, wherein the method further includes, at least, controlling the steps of monitoring and responding with a remote controller.

9. The method of claim 1, wherein the method further includes, at least, controlling the step of monitoring with a local controller.

10. The method of claim 1, wherein the step of monitoring includes, at least, identifying a communication path to monitor.

11. The method of claim 1, wherein the method further includes, at least, establishing a predetermined response to the detection of an attempted third party telephone call.

12. The method of claim 11 above, wherein the step of establishing includes, at least, storing the predetermined response.

13. The method of claim 1, wherein the step of responding includes, at least, disconnection of the communication path between the telephone call originator and the telephone call recipient.

14. The method of claim 1, wherein the step of responding includes, at least, storing a record of the attempted three-way telephone call placement.

15. The method of claim 1, wherein the step of responding includes, at least, playing a pre-recorded announcement to the telephone call originator and the telephone call recipient.

16. The method of claim 1, wherein the step of responding includes, at least, ignoring the detection of the attempted three-way telephone call placement and allowing the establishment of a communication path to a third party.

17. A method of detecting and responding to an attempted three-way telephone call placement, the method comprising the steps of;
   acquiring a digital signal from a communication path; and
   examining the digital signal to detect a signature representative of attempted three-way telephone call placement;
   wherein the step of acquiring includes, at least, tapping the communication path without substantially degrading the digital signal transmitted on the communication path.

18. The method of claim 17, wherein the step of acquiring includes, at least, amplifying the acquired digital signal.

19. The method of claim 18, wherein the step of examining includes, at least, sampling the digital signal to detect a three-way call signature comprising at least a first period of silence, a release pulse, and a second period of silence occuring sequentially.

20. The method of claim 19, wherein the step of sampling includes, at least, detecting a first period of silence lasting for a period of time ranging between 250 milliseconds and 1.2 seconds.

21. The method of claim 19, wherein the step of sampling includes, at least, detecting a second period of silence lasting for a period of time measuring at least 4 seconds.

22. The method of claim 17, wherein the step of examining includes, at least, sampling the acquired digital signal to detect a release pulse.

23. The method of claim 22, wherein the method further includes, at least, identifying a plurality of spectral characteristics of each of a plurality of previously identified release pulses.

24. The method of claim 23, wherein the step of examining further includes, at least, sampling the digital signal to identify a suspect release pulse, determining a plurality of spectral characteristics of the suspect release pulse, comparing the plurality of spectral characteristics of the suspect release pulse to each identified plurality of spectral characteristics of previously identified release pulses to discover a match between pluralities of spectral characteristics, and upon discovering a match between pluralities of spectral characteristics, identifying the suspect release pulse as the previously identified release pulse having the plurality of spectral characteristics which matches the plurality of spectral characteristics of the suspect release pulse.

25. An apparatus for processing a telephone call, said apparatus comprising:

a three-way call detector, connected to a communication path at a location distant from an originator telephone, wherein said communication path connects said originator telephone and a recipient telephone;

a controller operably connected to said three-way detector, and a bridge repeater electrically interposed between said three-way call detector and said communication path.

26. The apparatus of claim 25, wherein, said communication path carries digital signals representative of audible sound and voice energy, and said three-way call detector analyzes digital signals acquired from said communication path.

27. The apparatus of claim 25, wherein said communication path carries signals transmitted by said recipient telephone and received by said originator telephone.

28. The apparatus of claim 25, wherein said three-way call detector connects to said communication path at a location between a first switch and a second switch.

29. The apparatus of claim 25, wherein said controller connects to a switch positioned electrically between said originator telephone and said recipient telephone.

30. The apparatus of claim 25 wherein, said communication path carries indicia representative of a three-way call signature created at the recipient telephone, and said three-way call detector receives said indicia, whereby said three-way call detector analyzes said indicia to detect an attempted three-way call placement.

31. The apparatus of claim 25, wherein said three-way call detector includes, at least, a digital signal processor.

32. A method of detecting and responding to an attempted three-way telephone call placement, said method comprising the steps of;

acquiring a signal by monitoring a communication path from a monitoring device connected in parallel to the communication path; and examining the signal to detect a signature representative of attempted three-way telephone call placement, and responding in a predetermined manner.

33. An apparatus for processing a telephone call, said apparatus comprising:

a three-way call detector connected in parallel to a communication path at a location distant from a first telephone, wherein said communication path connects said first telephone and a second telephone; and a controller operably connected to said three-way call detector.

* * * * *